Dec. 30, 1930.   K. GEHLEN   1,786,745
FARE INDICATOR
Filed March 1, 1928   4 Sheets-Sheet 1
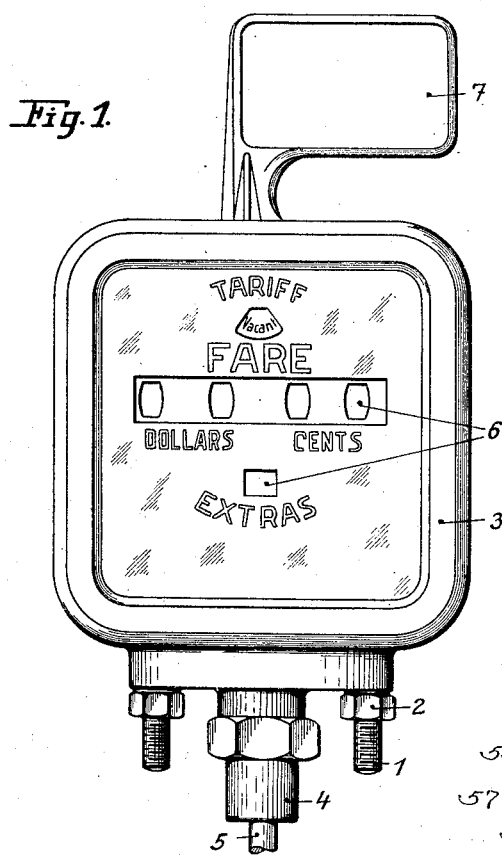
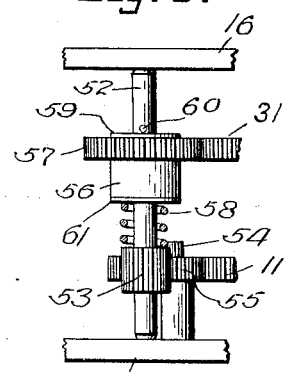
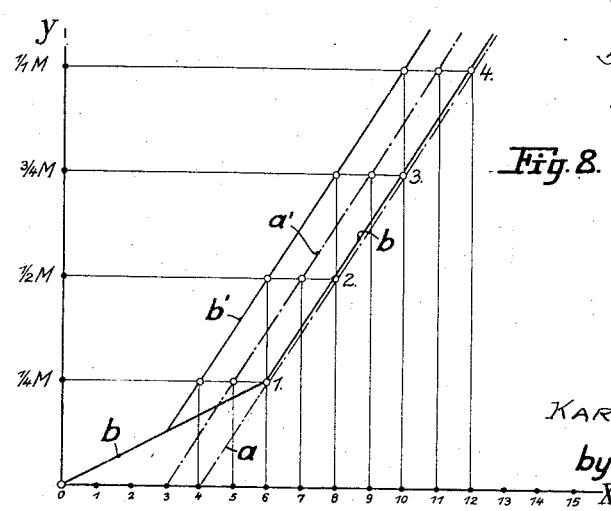
Inventor:
KARL GEHLEN
by:
Attorneys.

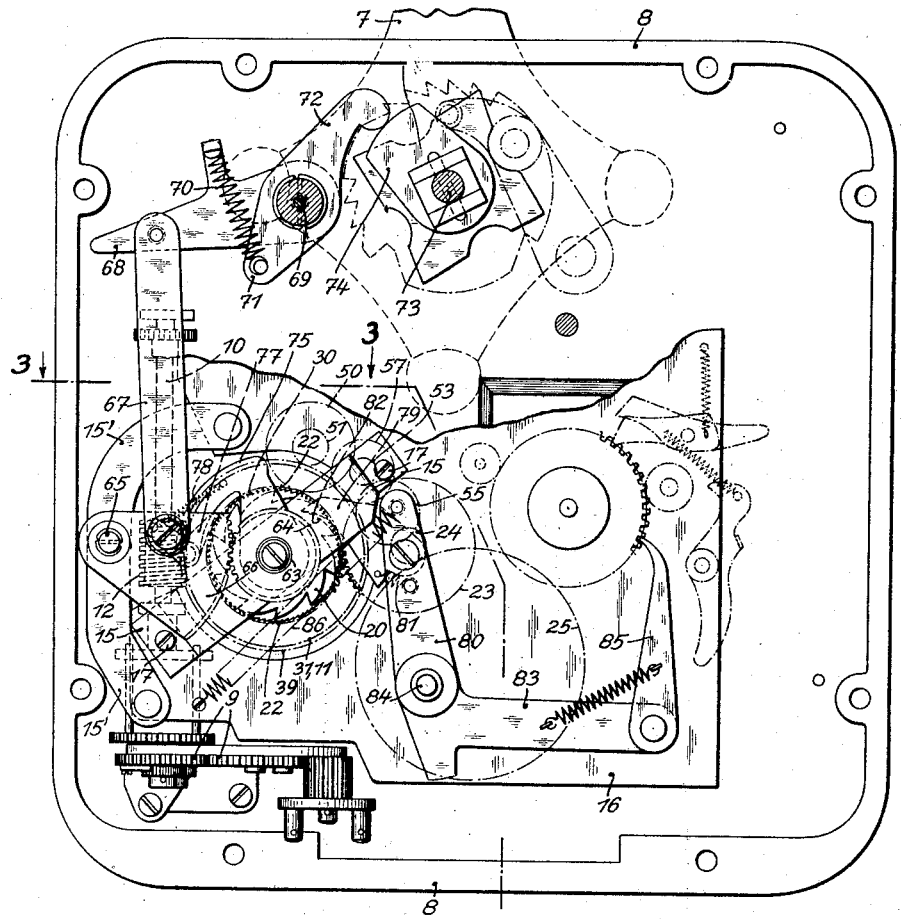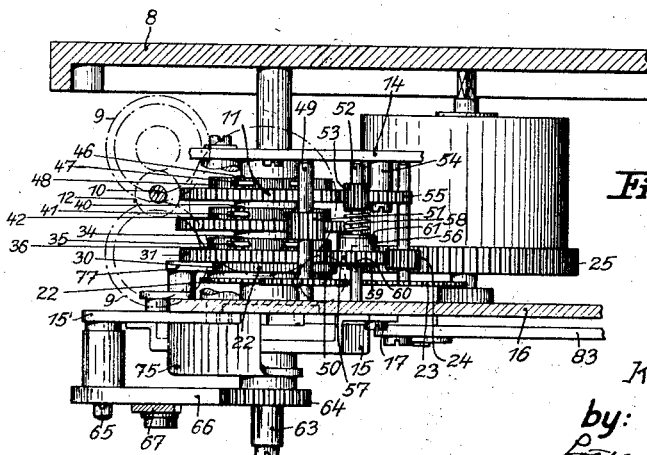

Dec. 30, 1930.    K. GEHLEN    1,786,745
FARE INDICATOR
Filed March 1, 1923    4 Sheets-Sheet 3
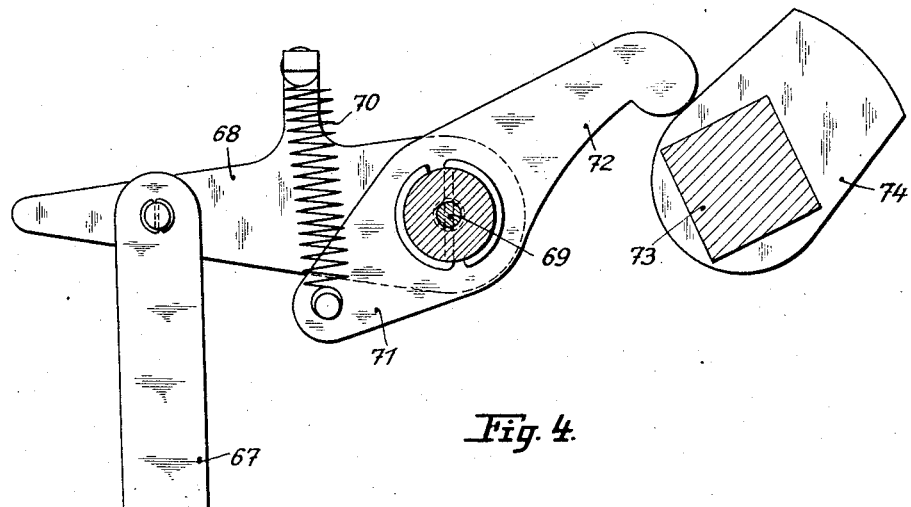
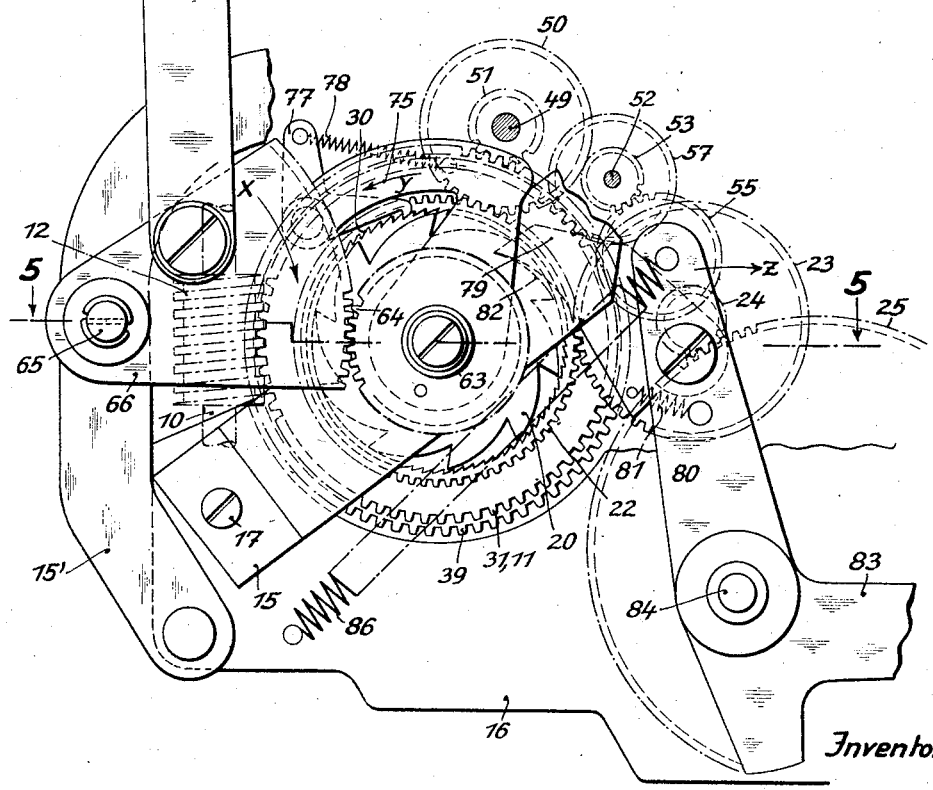
Fig. 4.
Inventor:
KARL GEHLEN
by:
Attorneys.

Dec. 30, 1930.　　　　K. GEHLEN　　　　1,786,745
FARE INDICATOR
Filed March 1, 1928　　4 Sheets-Sheet 4
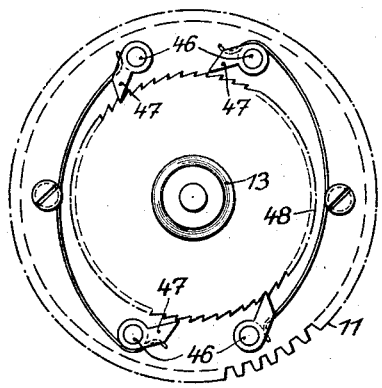
Fig. 6.
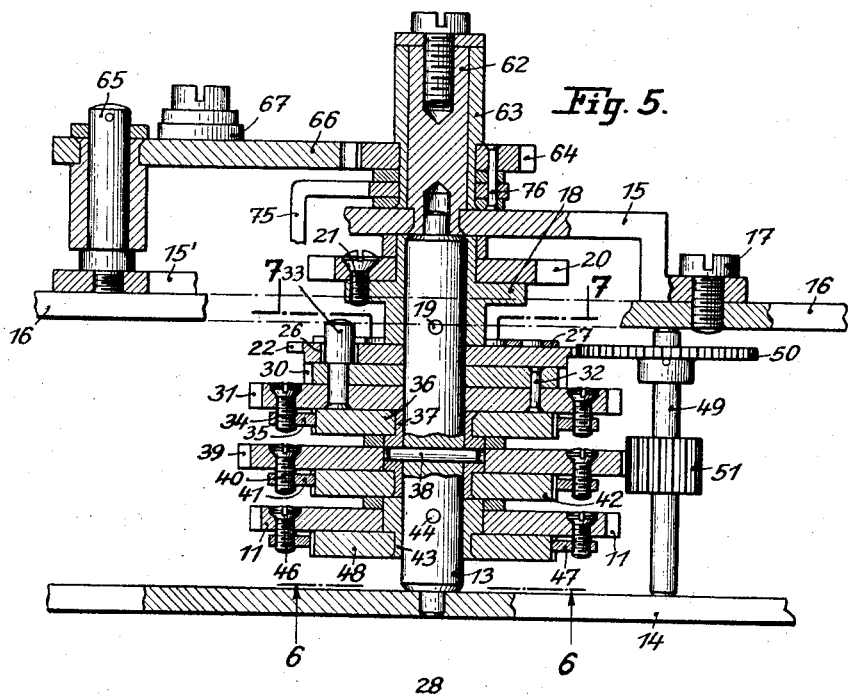
Fig. 5.
Fig. 7.
Inventor:
KARL GEHLEN
by
Locke, Kehlenbeck & Farley
Attorneys.

Patented Dec. 30, 1930

1,786,745

UNITED STATES PATENT OFFICE

KARL GEHLEN, OF VILLINGEN, GERMANY, ASSIGNOR TO KIENZLE UHRENFABRIKEN AKTIENGESELLSCHAFT, OF SCHWENNINGEN A. N., GERMANY, A CORPORATION OF GERMANY

FARE INDICATOR

Application filed March 1, 1928. Serial No. 258,207.

My invention relates to improvements in fare indicators, and more particularly in fare indicators in which provision is made for starting the regular operation of the figure wheels indicating the fare within a certain period of time after throwing the fare indicator into operation. In apparatus of this type such as are now in use the mechanisms connecting the said figure wheels with the clock work run idle for a certain period of time, the period of time during which the said mechanisms run idle corresponding to a certain time covered by an initial fare to be paid when engaging the vehicle irrespective of the length of the trip.

In some cases the driver is authorized to make a charge in addition to the initial charge when the vehicle has been engaged by a passenger is not immediately started. Therefore the figure wheels may be started immediately after throwing the fare indicator into operation, but they are rotated for a certain period of time at lower velocity than after the said period.

The object of the improvements is to provide a fare indicator by means of which the said additional charge is registered, and with this object in view my invention consists in providing an additional gearing intermediate the clock work and the figure wheels and having a gear ratio for reducing the velocity of the figure wheels as compared to the main gearing provided intermediate the clock work and the figure wheels, the said additional gearing running idle or being thrown out of operation after the main driving mechanism has made the movement sufficient for operatively connecting the same with the figure wheels. Thus, by providing the said additional gearing the figure wheels are started immediately after throwing the fare indicator into operation, and by providing a gearing by means of which the velocity of the figure wheels is reduced as compared to the velocity imparted thereto by the main gearing, the figure wheels are advanced at lower velocity during the period of time corresponding to the initial charge than after the said period of time and when the figure wheels are driven from the clock work through the main gearing.

For the purpose of explaining the invention an example embodying the same has been shown in the accompanying drawings, in which the same numerals and letters of reference have been used in all the views to indicate corresponding parts. In said drawings, Fig. 1 is an elevation of the fare indicator, the operating member or flag being in position for setting the indicator into out-of-service position, Fig. 2 is an elevation showing the parts of the mechanism mounted on the lid of the indicator, Fig. 3 is a sectional view taken on the line 3—3 of Fig. 2, Fig. 4 is an elevation on an enlarged scale showing certain parts illustrated in Fig. 2, Fig. 5 is a diagrammatical sectional view taken on the line 5—5 of Fig. 4, certain shafts and parts carried thereby which actually are not located in the said sectional plane having been shown in the said sectional plane, Fig. 6 is a bottom view looking in the direction of the arrows 6—6 of Fig. 5 and showing certain parts of the mechanism illustrated in the said figure, Fig. 7 is a sectional plan view taken on the line 7—7 of Fig. 5, Fig. 8 is a diagram illustrating the function of the improved fare indicator as compared to the function of a fare indicator of known construction, and Fig. 9 is a detail view of certain gear wheels and parts associated therewith.

In the example shown in the figures the fare indicator comprises a casing 3 adapted to be fixed by screws 1 and nuts 2 to the vehicle and provided with a tubular extension 4 through which a driving shaft 5 connected with a rotary part of the vehicle is passed into the casing, the said shaft being connected to the operative parts of the fare indicator. At the rear of peep holes 6 made in the wall of the casing the figure wheels indicating the fare are located, which figure wheels are displayed only when rocking the operating member 7 into position for throwing the fare indicator into operation. The said operating member is constructed in the form of a flag, as is known in the art.

The rotary movement of the driving shaft 5 is transmitted through a gearing 9 mounted on the lid 8 of the casing to a shaft 10 having a worm 12 fixed thereto, which is in engagement with a worm gear 11 rotatably mounted on a shaft 13 (Figs. 5, 6 and 7). The shaft 13 is mounted between a plate 14 fixed to the lid of the indicator and a bridge 15 spaced from the plate 14 and fixed to a second plate 16 by means of screws 17.

To the rear end of the shaft 13 a sleeve 18 is fixed by means of a pin 19, and to a flange of the said sleeve a cam disk 20 is fixed by screws 21, which cam disk is operatively connected with the figure wheels for imparting rotary movement thereto.

In front of the sleeve 18 a gear wheel 22 is rotatably mounted on the shaft 13, which gear wheel is connected by intermediate gear wheels 23, 24 (Fig. 2) with a gear wheel 25 adapted to be rotated by the spring of the clock work (not shown). The gear wheel 22 is formed with a concentric slot 26 (Figs. 5 and 7), and it has a segmental slide 27 fixed thereto by means of which the active length of the slot 26 is regulated, the said slide 27 being fixed in position by means of screws 28 passed through a concentric slot 29 of the segmental slide and engaging in screw holes made in the gear wheel 22. After loosening the screws 28 the slide 27 can be shifted in circumferential direction for varying the active length of the slot 26 of the gear wheel 22.

In front of the gear wheel 22 a ratchet wheel 30 is rotatably mounted on the shaft 13, the object of which will be explained hereinafter. The ratchet wheel 30 is connected with a gear wheel 31 by means of a pin 32 and a bolt 33, the gear wheel 31 being rotatable on the shaft 13. The rear end of the bolt 33 is passed through the concentric slot 26 of the gear wheel 22.

Near the margin of the gear wheel 31 pawls 35 are rockingly mounted on screws 34, and the said pawls are in engagement with a ratchet wheel 36 located in front of the gear wheel 31 and fixed to a sleeve 37 secured to the shaft 13 by means of a pin 38.

On the sleeve 37 a gear wheel 39 is rotatable, and near the margin of the said gear wheel pawls 41 are rockingly mounted on screws 40, the said pawls being in engagement with a ratchet wheel 42 located in front of the gear wheel 39 and fixed to the sleeve 37.

In front of ratchet wheel 42 and sleeve 37 a sleeve 43 is fixed to the shaft 13 by means of a pin 44, and on the said sleeve the worm gearing 11 is rotatable. On the said worm gearing pawls 47 are mounted by means of screws 46, which pawls are in engagement with a ratchet wheel 48 fixed to the sleeve 43.

Above the parts of the mechanism mounted on the shaft 13 a shaft 49 is rotatably mounted on the plates 14 and 16. To the said shaft 49 are secured rigidly a gear wheel 50 meshing with the gear wheel 22 and a pinion 51 meshing with the gear wheel 39 rotatably mounted on the shaft 13.

Further, a third shaft 52 (Figs. 3 and 9) is rotatably mounted on the plates 14 and 16, and to the said shaft a pinion 53 is secured which is connected with the worm gearing 11 by means of a gear wheel 55 rotatably mounted on a pivot bolt 54.

At the rear of the pinion 53 a gear wheel 57 fixed to a sleeve 56 is mounted, which is located between disks 59 and 61, the disk 59 bearing on a pin 60 fixed to the shaft 52. Between the pinion 53 and the disk 61 a spring 58 is located which holds the disks 59 and 61, the pin 60 and the sleeve 56 in frictional engagement with one another.

In axial alignment with the shaft 13 a bolt 62 (Fig. 5) is fixed to the bridge 15, and on the said bolt a sleeve 63 carrying a gear wheel 64 is rotatable. The gear wheel 64 is in mesh with a toothed sector 66 rockingly mounted on a bolt 65 fixed to a bridge 15' carried by the plate 16. The sector 66 is connected by a link 67 (Fig. 2) with a lever 68 rockingly mounted on a shaft 69 mounted on the lid of the casing. On the said shaft a second lever 71, 72 is rockingly mounted the arm 71 of which is connected with the arm 68 by a spring 70. The arm 72 of the lever is acted upon by a cam 74 secured to the shaft 73 carrying the operating member 7.

To the gear wheel 64 a lever 75 (Figs. 4 and 5) is fixed by means of a pin 76, which lever is likewise rockingly mounted on the bolt 62. On the front end of the said lever a pawl 77 is mounted which is acted upon by a spring 78 holding the same in engagement with the ratchet wheel 30.

The cam disk 20 is engaged by a pawl 79 jointed to an arm 80 of a bell crank lever 80, 83, a spring 81 attached to the said lever and pawl holding the pawl in engagement with the teeth 82 of the cam disk 20. To the arm 83 of the bell crank lever a pawl 85 (Fig. 2) is jointed, which acts on the figure wheels of the indicator. A spring 86 (Fig. 4) attached to the lever 80 and to a relatively fixed part of the indicator holds the pawl 79 in engagement with the cam disk 20.

The operation of the fare indicator is as follows:

I. At the end of a drive the fare indicator is set into out-of-service position, the operating lever 7 and the cam 74 are rocked into the position shown in Fig. 2. Thereby the toothed sector 66 is rocked about its bolt 65 in the direction of the arrow $x$ (Fig. 4) through the intermediary of the gearing 67 to 72. Therefore the gear wheel 64 and the lever 75 are rocked in the direction of the arrow y shown in Fig. 4, and such rocking movement is transmitted by the pawl 77 carried by the lever 75 to the ratchet wheel 30, which is likewise rocked in the direction of the arrow y. The rocking movement of the ratchet wheel is transmitted to the gear wheel 31 by the pin 33.

The gear wheel 31 is in mesh with the gear wheel 57, but its movement is made possible by reason of the frictional engagement of the sleeve 56 carrying the gear wheel 57 with the disks 59 and 61, the said friction coupling permitting rotation of the sleeve 56 on the shaft 52.

Further, the rocking movement of the gear wheel 31 relatively to the ratchet wheel 36 is made possible by the pawls 35 loosely riding on the teeth of the ratchet wheel 36.

Gear wheel 31 is rocked on the shaft 13 so far that the bolt 33 gets into the position shown in Fig. 7 in broken lines.

Whenever, as referred to hereinabove, an initial charge is made irrespective of the length of time the vehicle is used or of the length of the trip, the mechanism is so constructed that when bringing the parts back to the out-of-service position, the fare wheel or number wheel of the lowest denomination (indicating, say units of five cents each) will not be brought back to zero but to a position corresponding to said initial charge, for instance fifteen cents or twenty cents as the case may be. Furthermore, when the parts are brought into the out-of-service position, the cam disk 20 (Fig. 4) is, by means of the pawl 77 on the lever 75 and by means of the ratchet wheel 30, brought to such a position that the pawl 79 will engage immediately adjacent to the approximately radial flank of a tooth of such cam disk as illustrated in Fig. 4. When thereupon the fare indicator is put into operation and the vehicle set in motion, the cam disk 20 will have to be turned approximately the entire distance of a tooth space by the drive operated by the travel of the vehicle, before the pawl 79 can drop into the next space of the cam disk, that is to say, before the first number wheel is fed forward by one unit.

Should the fare indicator be set in operation while the vehicle is standing still, the cam disk 20, which in this case is driven by the clock-work, will likewise turn by approximately the distance of one tooth space before the first number wheel will receive its first feeding operation. To accomplish this while the car is standing still, however, will require considerably more time than when the fare indicator is driven by the travel of the vehicle, since on the one hand the lost motion corresponding to the slot 26 (see Fig. 7) must be taken up and on the other hand the train of gears 50, 51 (Fig. 5) will give the cam disk 20 a reduced rotation.

Therefore, if the vehicle is standing still at the time the fare indicator is thrown in, the cam disk 20 begins to rotate immediately, but owing to the reduction gearing 50, 51, this motion is much slower than if the cam disk is operated by the travel of the vehicle, or even when the cam disk is operated directly by the clock-work in the event of the bolt 33 being in contact with the slide 27. It will thus be understood that when the fare indicator is thrown in, the cam disk 20 will always be operated, whether by the travel of the vehicle or by the clock-work, but the velocity at which this cam disk rotates will be different according to the conditions explained, that is to say, the fare indicator will show an increase of fare more quickly if the vehicle is travelling than if it is standing still.

II. When throwing the fare indicator into operative position by rocking the lever 7 into position for registering the fare, the following conditions are possible:

a. The vehicle carrying the fare indicator is started immediately after throwing the indicator into operation.

The movement of the vehicle is transmitted by means of the driving shaft 5, the gearing 9, 10 and the worm 12 to the worm gearing 11. By means of the pawls 47 carried by the worm gearing 11, the ratchet wheel 48 and the shaft 13, the cam 20 is rotated in the direction of the arrow y shown in Fig. 4.

Upon rotation of the cam disk 20 the pawl 79 gradually slides on one of the teeth 82 of the said cam disk, thus rocking the arm 80 of the bell crank lever 80, 83 in the direction of the arrow z shown in Fig. 4, and whenever the pawl 79 has arrived at the outer end of a tooth 82, it is rocked by the springs 81 and 86 into engagement with the next tooth, the bell crank lever 80, 83 being rocked on the shaft 84 in a direction opposite to the arrow z. The lever 85 advances the main driving wheel of the numeral wheels of the fare indicator through a certain angle. Thus the numeral wheels of the fare indicator are advanced in accordance with the movement of the vehicle.

The worm gearing 11 is connected with the gearing consisting of the wheels 55, 53 and 57 and cooperating with the gear wheel 31. But it is necessary that the rotary movement of the worm gearing be not interfered with, even if the bolt 33 of the gear wheel 31 has been brought from its inoperative position shown in Fig. 7 into the position corresponding to the vehicle being driven, in which position the bolt bears on the slide 27. Therefore the shaft 52 is further rotated while overcoming the friction between the disks 59, 61 and the sleeve 56, while the gear wheel 57 is arrested by the gear wheel 31 which is now at rest.

The friction coupling provided by the disks 59, 61 is further important because the clock work started when throwing the fare indicator into operation and cooperating with the gear wheel 22 slowly rotates the said gear wheel in the direction of the arrow y shown in Fig. 7. Also this movement of the gear wheels 22 and 31 is made possible by reason of the friction coupling.

b. After throwing the fare indicator into operation the vehicle does not immediately begin the trip.

In this case the numeral wheels of the fare indicator are driven from the clock work as follows: The movement of the gear wheel 25 directly connected with the clock work is transmitted through the gear wheels 23 and 24 to the gear wheel 22.

The worm gearing 11 which otherwise is rotated by a rotary part of the vehicle now is at rest. If the gear wheels 50 and 51 were not provided the rotary movement of the gear wheel 22 in the direction of the arrow y shown in Fig. 7 would not be transmitted to the operative parts of the mechanism, until the active edge of the slide 27 has engaged the bolt 33, which is in the position shown in Fig. 7 in broken lines. Only after the said slide has engaged the bolt 33, the rotary movement of the gear wheel 22 would be transmitted through the intermediary of the gear wheel 31, the pawls 35, the ratchet wheel 36 and the shaft 13 to the cam disk 20. Thus the numeral wheels of the fare indicator would not be advanced, and no charge would be made.

But by providing the intermediate gearing 49 to 51 the movement of the gear wheel 22 driven by the clock work is transmitted to the gear wheel 39 and, through the intermediary of the pawls 41, the ratchet wheel 42 and the shaft 13, to the cam disk 20 immediately after throwing the fare indicator into operation. The said intermediary gearing is constructed for reducing velocity, and therefore the movement of the cam disk 20 is at first slow as compared to the movement directly transmitted by the gear wheel 22. Therefore the cam disk 20 acting on the numeral wheels is rotated during the initial period of time so far that shortly after the end of the said initial period of time or after beginning the trip the numeral wheels of the fare indicator are advanced.

In known fare indicators in which no intermediate gearing is provided between the clock work and the numeral wheels, the numeral wheels are not advanced during the whole period of time or when driving through an initial trip portion corresponding to the said period of time, so that no extra charge is made in addition to the initial charge. But in my improved indicator the said initial charge is registered on the numeral wheels.

The difference between the velocity of the gear wheel 31 connected with the gear wheel 22 and the gear wheel 39 slowly rotated by the intermediate gearing and likewise acting on the shaft 13 is possible in view of the pawls 41 acting on gear wheel 39, the said pawls riding on the teeth of the ratchet wheel 42 when the cam disk 20 is driven by gear wheel 22, so that independent movement of the parts of the mechanism is possible and any injury to the said parts is avoided.

c. Interruption of the trip.

If a stop is made in the course of the trip, the figure wheels are advanced in the same way as in case of the vehicle standing for a certain time after being engaged, through the intermediary of gear wheel 22, from the clock work. If the vehicle is stopped before having made a trip of the length covered by the initial fare or prior to the end of the period of time covered by the initial fare, the cam disk is slowly driven from the clock work through the intermediary of gear wheel 22, intermediate gearing 50, 51 and gear wheel 39.

In the diagram shown in Fig. 8 I have illustrated the operation of the improved fare indicator as compared to that of a fare indicator now in use. The horizontal abscissa axis X carries marks indicating minutes, and on the vertical ordinate axis Y equal lengths of travel have been marked in fractions of a mile.

The line a drawn in dashes and dots represents the movement of the figure wheels of fare indicators now in use. In the example represented by the diagram the period of time for which the initial fare is charged in six minutes, and after the said six minutes the indicator is advanced every two minutes. Four minutes of the said initial six minutes are covered by the movement of the gear wheel 22 with its bolt 33 to the slot 26, while the further two minutes correspond to the length of the cam face of one of the teeth 82 of the cam disk 20. Therefore, if the intermediate gearing 50, 51 is not provided, the cam disk 20 is started only after four minutes. After two minutes more, that is six minutes after engaging the vehicle, the pawl 79 riding on the operative tooth 82 is rocked into the next notch, so that the figure wheels are advanced, and after the period of six minutes the figure wheels are advanced, every two minutes. The said six minutes of the initial period of time and the periods of two minutes following the said initial period of time correspond to a length of travel of ¼ mile.

The full line b represents the movement of the figure wheels when providing an intermediate gearing 50, 51. As appears from the said diagram, the figure wheels are advanced for the first time after six minutes, and thereafter every two minutes.

If now the vehicle provided with the fare indicator described above is started say three minutes after being engaged, as is represented by the line $b'$, it is not necessary for the mechanism driven by a rotary part of the vehicle to complete the whole length of the cam face of the tooth 82, as is the case in indicators now in use, but only one half of the length of the said cam face. The operation of the known fare indicators having no intermediate gearing has been illustrated by the line $a'$, it being assumed that the vehicle is started three minutes after being engaged.

Thus by providing the intermediate gearing 49 to 51, the figure wheels are slowly advanced immediately after throwing the fare indicator into operation.

I claim:

1. A fare indicator, comprising the figure wheels, a clock work for operating said figure wheels, a main mechanism intermediate said clock work and figure wheels including a part running idle for a certain period of time after throwing the clock work into operation, and a subsidiary gearing intermediate the clock work and figure wheels operative while the said part runs idle for advancing the figure wheels from the clock work.

2. A fare indicator, comprising the figure wheels, a clock work for operating said figure wheels, a main mechanism intermediate said clock work and figure wheels including a part running idle for a certain period of time after throwing the clock work into operation, a subsidiary gearing intermediate the clock work and figure wheels operative while the said part runs idle for advancing the figure wheels from the clock work, and coupling means operative only under certain conditions and disposed respectively between said intermediate gearing and the figure wheels and the clock work.

3. A fare indicator, comprising the figure wheels, a cam disk adapted to operate said figure wheels, a shaft carrying said cam disk, a clock work for operating said figure wheels, a main mechanism connected with said shaft and intermediate said clock work and figure wheels including a part running idle for a certain period of time after throwing the clock work into operation, transmitting members one connected with said clock work and one connected with said shaft, coupling means acting in one direction only connecting said clock work and shaft respectively with said transmitting members, and a subsidiary gearing intermediate said transmitting members.

4. A fare indicator as claimed in claim 1, in which the transmitting member cooperating with said subsidiary gearing is rotatably mounted on the shaft carrying the cam disk and adapted to be coupled with the said shaft by means of pawls for operation in the direction of the movement of said cam disk.

In testimony whereof, I have signed this specification.

KARL GEHLEN.